United States Patent [19]

Mitchell

[11] Patent Number: 5,182,319

[45] Date of Patent: Jan. 26, 1993

[54] PRESSURE SENSITIVE BITUMINOUS COMPOSITIONS

[75] Inventor: Grant D. Mitchell, Joplin, Mo.

[73] Assignee: Tamko Asphalt Products, Inc., Joplin, Mo.

[21] Appl. No.: 767,082

[22] Filed: Sep. 27, 1991

[51] Int. Cl.$^5$ ..................... C08L 53/00; C08L 53/02
[52] U.S. Cl. ..................................... 524/68
[58] Field of Search ........................ 524/68

[56] References Cited

U.S. PATENT DOCUMENTS

| | | | |
|---|---|---|---|
| H876 | 1/1991 | Gilmore et al. | 524/68 |
| T. 964,011 | 11/1976 | Blanken | 428/489 |
| 3,325,430 | 6/1967 | Grasley | 260/25 |
| 3,345,316 | 10/1967 | Nielsen | 260/28.5 |
| 3,978,014 | 8/1976 | van Beem et al. | 260/28.5 AS |
| 4,032,491 | 6/1977 | Schoenke | 260/28.5 AS |
| 4,115,335 | 9/1978 | Reusser et al. | 260/28.5 AS |
| 4,129,541 | 12/1978 | Marrs et al. | 260/28.5 AS |
| 4,196,115 | 4/1980 | Bresson | 260/28.5 B |
| 4,250,067 | 2/1981 | Bresson | 260/28.5 AS |
| 4,743,497 | 5/1988 | Thorsrud | 524/68 |
| 4,876,130 | 10/1989 | Vonk et al. | 524/62 |
| 4,904,713 | 2/1990 | Vonk et al. | 524/68 |
| 4,973,615 | 11/1990 | Futamura et al. | 524/66 |

FOREIGN PATENT DOCUMENTS

| | | |
|---|---|---|
| 819786 | 8/1969 | Canada. |
| 1193627 | 6/1970 | United Kingdom. |
| 1193628 | 6/1970 | United Kingdom. |

*Primary Examiner*—Paul R. Michl
*Assistant Examiner*—LaVonda R. DeWitt
*Attorney, Agent, or Firm*—Richards, Medlock & Andrews

[57] ABSTRACT

A pressure sensitive bituminous composition having improved tack and adhesiveness, comprising: (1) from about 50% to about 87% of a bituminous component; from about 1 to about 15% of a thermoplastic block copolymer, $M_1$, of the A-B-A type, preferably styrene-butadiene-styrene; (3) from about 1% to about 10% of a block copolymer, $M_2$, of the A-B type, preferably styrene-butadiene; and (4) from about 5% to about 50% of a fumed silica. The fumed silica is an active ingredient which absorbs excess oil and improves the tack and adhesiveness of the final composition.

23 Claims, No Drawings

PRESSURE SENSITIVE BITUMINOUS COMPOSITIONS

TECHNICAL FIELD OF THE INVENTION

The present invention relates to novel pressure sensitive bituminous compositions which are especially useful in the preparation of articles requiring self-adhesive properties based on bituminous compositions and which are cold applicable. The compositions, according to the present invention, comprise at least a bituminous component, two different polymeric components and a fumed silica and exhibit improved tack and adhesiveness.

BACKGROUND OF THE INVENTION

Compositions consisting of a bituminous component, thermoplastic polymer component, and various fillers are known in the art. They can be applied in the production of products such as below grade waterproofing, water-resistant membranes for road application, and in roofing membranes. Such compositions, however, typically require the use of solvent based bitumen mastics or application with hot bitumen, which require additional equipment not readily available to the average individual.

Heretofore fillers have been admixed with bituminous and thermoplastic polymer compositions as inactive ingredients used for decreasing cost and extending the composition. Commonly used fillers include limestone, dolomite, fly ash, silica sand, etc. For instance, U.S. Pat. No. 4,196,115 to Bresson discloses an asphalt composition with at least two different copolymers derived from a conjugated diene and a monovinyl aromatic and fillers such as silicates, carbonates, etc., and mineral aggregates such as sand, chat, pebbles or rock. These fillers play no role as an active ingredient of the composition and are therefore considered as a minor component.

The present invention addresses the current need for a cold applicable bituminous composition for roofing and paving materials with improved tack and adhesiveness. The inventive composition replaces the need for hot bituminous adhesives which create hazardous fumes, and requires expensive equipment, and also reduces the release of volatile organic compounds (VOCs) into the atmosphere found in cold application cements.

The present invention incorporates the use of fumed silica as an active ingredient in the bituminous composition. The use of fumed silica improves the composition in several areas not indicated in the prior art. As an active ingredient, the fumed silica promotes the retention of oils in the composition that, if not retained, reduce the adhesive characteristics of the bituminous composition. The interactive nature of the fumed silica promotes increased tack and adhesion of the bituminous composition. Adhesion to various substrates such as aluminum, galvanized metal, wood, and masonry is enhanced by the fumed silica. The performance (adhesion, slipping) of the present inventive composition on vertical angles at high temperatures is markedly improved over similar compositions that exclude the use of fillers or use a nonactive filler (e.g., limestone, silica sand, fly ash, etc.).

SUMMARY OF THE INVENTION

The present invention relates to a pressure sensitive bituminous composition which exhibits excellent adhesiveness and tack. Specifically, the novel pressure sensitive bituminous composition comprises by weight from about 50% to about 87% of a bituminous component; from about 1% to about 15% of a thermoplastic A-B-A type block copolymer, $M_1$; from about 1% to about 10% of a thermoplastic A-B type block copolymer, $M_2$, such that the percentage of $M_1$ and $M_2$ in combination is at least about 3%; and from about 5% to about 50% fumed silica.

A preferred pressure sensitive bituminous composition comprises from about 61% to about 86% of a bituminous component; from about 5% to about 10% of a thermoplastic A-B-A type block copolymer, $M_1$; from about 2% to about 3% of a thermoplastic A-B type block copolymer, $M_2$; and from about 20% to about 30% fumed silica.

A most preferred pressure sensitive bituminous composition comprises from about 62% to about 68% of a bituminous component; from about 7% to about 8% of a thermoplastic A-B-A type block copolymer, $M_1$; from about 2.1% to about 2.4% of a thermoplastic A-B type block copolymer, $M_2$; and from about 23% to about 27% fumed silica, said fumed silica having an average particle diameter less than or equal to about 0.1 micron. A most suitable A-B-A type block copolymer is available from Shell under the trade designation RP6400. A most suitable A-B type block copolymer is also available from Shell under the trade designation DX1118.

DETAILED DESCRIPTION

The features and advantages of the present invention are meant to be illustrative rather than exhaustive. Further advantages and features of the present invention will become apparent while reviewing the detailed description of the invention.

The pressure sensitive bituminous composition of the present invention comprises four ingredients (by weight):

(1) about 50% to about 87% bituminous component;
(2) about 1% to about 15% thermoplastic A-B-A type block copolymer ($M_1$);
(3) about 1% to about 10% thermoplastic A-B type block copolymer ($M_2$); and
(4) about 5% to about 50% fumed silica The bituminous component is preferably a petroleum asphalt. Examples of suitable bituminous components include distillation or "straight-run" bitumens and blown bitumens. Suitable bituminous components are those having a penetration of 250–450 (0.1 mm) at 25° C. as measured by ASTM D5. Preference is given to the use of bitumens having a penetration of from 300–400 (0.1 mm) at 25° C. as measured by ASTM D5. In addition to the penetration parameter, suitable bituminous components have a total aromatic content from about 45% to about 75% by weight of the bitumen. Preferably, the bituminous component has an aromatic content of about 45% to about 50% and a polar aromatic content of about 16% to about 24% by weight of the bituminous component. The amount of bituminous component may range from about 50% to about 87% by weight of the total composition. It is preferred that the bituminous component range from about 61% to about 86% by weight of the total composition and more preferably from about 62% to about 68%.

According to the invention, use is made of two different polymers, $M_1$ and $M_2$, each having a different function. Polymeric component $M_1$ serves to give the final composition an improved resistance to flow at higher temperatures, while polymeric component $M_2$ causes improved tack and improved adhesion to other materials.

Polymeric component $M_1$ is a block copolymer of A-B-A type. Preferably, polymeric component $M_1$ has polystyrene end blocks A and a rubbery polybutadiene midblock B. However, other suitable A-B-A type block copolymers are described in U.S. Pat. No. 3,978,014, which is hereby incorporated by reference. These A-B-A type block copolymers have polymer blocks A which are the same or different thermoplastic non-elastomeric polymers prepared by polymerization of one or more monoalkenyl aromatics and at least one polymer block B which is an elastomeric polymer block prepared either by polymerization of one or more conjugated alkadienes or by copolymerization of one or more conjugated alkadienes with one or more monovinyl aromatics. Preferably, the average molecular weight of polymeric component $M_1$ is about 150,000 to about 200,000, with the most preferred average molecular weight being about 175,000 to about 180,000. A polymer composition which meets the above specifications and has been found to impart desired characteristics is available from Shell under the trade designation RP6400. RP6400 primarily consists of an A-B-A (styrene-butadiene-styrene) block copolymer and a small portion of A-B type block copolymer and has an average molecular weight of 172,044, a solubility parameter of 7.8 to 8.8 and a crystallinity of 0.07 at 25° C.

Copolymers that may be used as component $M_2$ according to the invention must be of the A-B type in which block A represents a thermoplastic polymer block prepared by polymerization of one or more alkenyl aromatics, and block B represents an elastomeric polymer block prepared either by polymerization of one or more conjugated alkadienes or by copolymerization of one or more conjugated alkadienes with one or more monovinyl aromatics. Preferably, polymeric component $M_2$ has one end block A of polystyrene and a rubbery polybutadiene midblock B and has an average molecular weight between about 85,000 and about 105,000, with the most preferred average molecular weight between about 95,000 and about 98,000. A copolymer which meets the specifications of component $M_2$ and has been found to impart the desired characteristics is available from Shell under the trade designation DX1118. DX1118 contains an A-B type block copolymer and has an average molecular weight of 96,688, a solubility parameter of 7.8 to 8.8 and a crystallinity of 0% at 25° C.

The amount of block copolymer $M_1$ may range from about 1% to about 15% by weight of the final composition. Preferably, the amount of block copolymer $M_1$ ranges from about 5% to about 10% by weight of the final composition and most preferably from about 7% to about 8%. The amount of block copolymer $M_2$ may range from about 1% to about 10% by weight of the final composition. Preferably, the amount of block copolymer $M_2$ ranges from about 2% to about 3% by weight of the final composition and most preferably from about 2.1% to about 2.4%. The total amount of the two block copolymers $M_1$ and $M_2$ in the final composition should be at least about 3% by weight of the final composition. Preferably, the total amount of the two block copolymers in the final composition ranges from about 9.1% to about 10.4% by weight of the final composition.

The pressure sensitive bituminous composition according to the present invention further comprises a fumed silica. Fumed silicas typically have an average particle size ranging from about 1.0 microns to less than about 0.007 microns in diameter. Preferably, the average particle size of the fumed silica is less than about 0.5 microns in diameter, with an average particle size of less than or equal to about 0.1 microns being most preferred. A suitable fumed silica is available from Analytical Materials, Inc., located in Joplin, Mo. This fumed silica is derived from a ferro-silicate alloy manufacturing process and is especially fine, with particles having an average diameter of 0.1 microns and a density of 10-12 pounds per cubic foot and contains by weight about 75-80% amorphous silicone dioxide and about 20% to 25% metal oxides and inert fillers. The amount of the fumed silica used in the present invention may range from about 5% to about 50% by weight of the final composition. The preferred amount of fumed silica to be used in the pressure sensitive bituminous composition ranges from about 20% to about 30% by weight of the final composition, with about 23% to about 27% being most preferred. It has been found that use of the fumed silica imparts improved tack and adhesiveness to the bitumen-polymer compositions disclosed herein. Hence, the fumed silica, unlike the fillers used in polymer modified bitumen compositions heretofore, is an active, property enhancing ingredient. It has also been found that the fumed silica promotes the retention of oils in the composition which, if not retained, reduces the adhesive properties of the final composition.

In summary, the preferred embodiments of the present invention are as follows:

| Component | Percent by Weight of Final Composition | | |
|---|---|---|---|
| | Suitable | Preferred | Most Preferred |
| Bituminous component | 50-87 | 61-86 | 62-68 |
| Copolymer (A-B-A), $M_1$ | 1-15 | 5-10 | 7-8 |
| Copolymer (A-B), $M_2$ | 1-10 | 2-3 | 2.1-2.4 |
| Fumed Silica | 5-50 | 20-30 | 23-27 |

The inventive composition is conveniently made by first blending, by conventional methods, the two thermoplastic polymers, $M_1$ and $M_2$, with the bituminous component at temperatures between 325°-425° F. Next, the fumed silica is added to the thermoplastic polymer modified bitumen by mixing, preferably by paddle mixers, while the thermoplastic polymer modified bitumen is maintained above 325° F.

The inventive composition may be used in several different roofing applications and on different carriers. For example, the composition may be used in conjunction with polyester or fiberglass reinforcements. The following example is presented to show a preferred embodiment of the invention. It is not intended to limit the scope or content of the disclosure or invention. The preferred composition includes by weight:

(1) about 65.25% bitumen
(2) about 7.5% $M_1$ thermoplastio polymer (RP6400)
(3) about 2.25% $M_2$ thermoplastic polymer (DX1118)

(4) about 25.0% fumed silica (Analytical Materials, Inc.)

The present invention is illustrated by means of the following examples.

EXAMPLE 1

A pressure sensitive bituminous composition was prepared by mixing 65.25% weight of a bitumen component having a penetration of 350 (0.1 mm) at 25° C. as measured by ASTM D5; 7.5% weight of $M_1$ thermoplastic polymer being a styrene-butadiene-styrene (SBS) block copolymer; 2.25% weight of $M_2$ thermoplastic polymer being a styrene-butadiene (SB) block copolymer; and 25.0% weight of fumed silica.

The pressure sensitive bituminous composition above was applied to a polyester membrane at a rate of 20-25 mils, having the dimensions of 1 inch by 6 inches and weighing 15 grams. Resistance to flow was measured by adhering the 1 inch by 6 inch strips to an aluminum panel with 3 lbs./sq. in. of pressure for a thirty-second time interval. Samples were placed vertically in a forced air oven and maintained at 70° C. for 7 days with no movement of the sample. This illustrates the adhesive characteristics and thermal stability of the preferred composition. Additional samples consisting of the same components comprised in the preferred composition, but replacing the fumed silica with inexpensive fillers used by those in the art (e.g., limestone, fly ash, and silica sand) were evaluated in the same manner as described above for the preferred composition. The results are given in the following table:

| HIGH TEMPERATURE ADHESION AND STABILITY | | | |
|---|---|---|---|
| Filler Type | Percent Loading | Result | Time (Hours) |
| No filler | 0 | Failure | 4 |
| Fumed Silica | 20 | Pass | No movement after 14 days-test discontinued |
| Fumed Silica | 25 | Pass | No movement after 7 days-test discontinued |
| Fumed Silica | 30 | Pass | No movement after 7 days-test discontinued |
| Dolomite | 20 | Failure | 22½ |
| Dolomite | 40 | Failure | 21½ |
| Limestone | 20 | Failure | 3 |
| Limestone | 40 | Failure | 21 |
| Silica Sand | 20 | Failure | 45 |
| Silica Sand | 40 | Failure | 21 |
| Fly Ash | 20 | Failure | 20 |
| Fly Ash | 40 | Failure | 31 |

From the results, it is clear that the pressure sensitive bituminous compositions, according to the present invention, possess a more than adequate adhesion under the temperature and orientation as described above. In addition, the use of fumed silica is illustrated to be an active ingredient that promotes the stability and adhesiveness of the composition as contrasted with the inexpensive nonactive fillers known in the industry as extenders.

The example and descriptions provided are meant to be a clear indication of the inventive composition. However, reasonable modifications and variations are possible without departing from the spirit or scope of the invention.

I claim:

1. A pressure sensitive bituminous composition having improved adhesiveness and tack comprising:
    a) from about 50% to about 87% by weight of a bituminous component having a penetration rate between about 250 and about 450 (0.1 mm) at 25° C. and a total aromatic content from about 45% to about 75% by weight of the bituminous component;
    b) from about 1% to about 15% by weight of a first block copolymer $M_1$ of the A-B-A type in which the two A blocks are the same or different thermoplastic non-elastomeric polymer blocks prepared by polymerization of one or more monoalkenyl aromatics and in which the polymer block B is an elastomeric polymer block prepared either by polymerization of one or more conjugated alkadienes with one or more monovinyl aromatics;
    c) from about 1% to about 10% by weight of a second block copolymer $M_2$ of the A-B type in which block A represents a thermoplastic polymer block prepared by polymerization of one or more alkenyl aromatics and block B represents an elastomeric polymer block prepared either by polymerization of one or more conjugated alkadienes or by copolymerization of one or more conjugated alkadienes with one or more monovinyl aromatics, such that the percentage of said first block copolymer $M_1$ and said second block copolymer $M_2$ in combination is at least about 3%; and
    d) from about 5% to about 50% by weight of a fumed silica.

2. The pressure sensitive composition of claim 1, wherein the weight percentage of said bituminous component is between about 61% and about 86%.

3. The pressure sensitive composition of claim 1, wherein the weight percentage of said bituminous component is between about 62% and about 68%.

4. The composition of claim 1 wherein said bituminous component has a penetration rate of about 300 to about 400 (0.1 mm) at 25° C.

5. The composition of claim 1 wherein said total aromatic content consists of an aromatic content of about 45% to about 50% and a polar aromatic content of about 16% to about 24% by weight of said bituminous component.

6. The composition of claim 1 wherein said first block copolymer $M_1$ has an average molecular weight between about 150,000 and about 200,000.

7. The composition of claim 1 wherein said first block copolymer $M_1$ has an average molecular weight between about 175,000 and about 180,000.

8. The composition of claim 1 wherein said second block copolymer $M_2$ has an average molecular weight between about 85,000 and about 105,000.

9. The composition of claim 1 wherein said second block copolymer $M_2$ has an average molecular weight between about 95,000 to about 98,000.

10. The composition of claim 1 wherein the weight percentage of first block copolymer $M_1$ is between about 5% and about 10%.

11. The composition of claim 1 wherein the weight percentage of first block copolymer $M_1$ is between about 7% and about 8%.

12. The composition of claim 1 wherein the weight percentage of second block copolymer $M_2$ is between about 2% and about 3%.

13. The composition of claim 1 wherein the weight percentage of second block copolymer $M_2$ is between about 2.1% and about 2.4%.

14. The composition of claim 1 wherein the percentage of said first block copolymer $M_1$ and second block copolymer $M_2$ in combination is from about 9.1% to about 10.4% by weight of the final composition.

15. The composition of claim 1 wherein the weight percentage of said fumed silica is between about 20% to about 30%.

16. The composition of claim 1 wherein the weight percentage of said fumed silica is between about 23% and about 27%.

17. The composition of claim 1 wherein said fumed silica has an average particle size less than or equal to about 0.5 microns in diameter.

18. The composition of claim 1 wherein said fumed silica has an average particle size less than or equal to about 0.1 microns in diameter.

19. The composition of claim 1 wherein said first block copolymer $M_1$ has polystyrene blocks A and a polybutadiene block B, and said second block copolymer $M_2$ has a polystyrene block A and a polybutadiene block B.

20. The composition of claim 1 wherein:
    (a) the weight percentage of said bituminous component is between about 61% and about 86%;
    (b) the weight percentage of said first block copolymer $M_1$ is between about 5% and about 10%;
    (c) the weight percentage of said second block copolymer $M_2$ is between about 2% and about 3%; and
    (d) the weight percentage of said fumed silica is between about 20% and about 30%.

21. The composition of claim 1 wherein:
    (a) the weight percentage of said bituminous component is between about 62% and about 68%;
    (b) the weight percentage of said first block copolymer $M_1$ is between about 7% and about 8%;
    (c) the weight percentage of said second block copolymer $M_2$ is between about 2.1% and about 2.4%; and
    (d) the weight percentage of said fumed silica is between about 23% and about 27%.

22. The composition of claim 21 wherein said fumed silica has an average particle size less than or equal to about 0.1 microns in diameter.

23. A pressure sensitive bituminous composition having improved adhesive properties comprising:
    a) about 65.25% by weight of a bituminous component having a penetration rate between 250 and 450 (0.1 mm at 25° C. and a total aromatic content from 45% to 75% by weight of the bituminous component;
    b) about 7.5% by weight of a first block copolymer, $M_1$, of the A-B-A type with polystyrene end blocks A and a rubbery polybutadiene midblock B;
    c) about 2.25% by weight of a second block copolymer, $M_2$, of the A-B type with a polystyrene end block A and a polybutadiene midblock B;
    d) 25.0% by weight of a fumed silica having an average particle size less than or equal to about 0.1 microns in diameter.

* * * * *

UNITED STATES PATENT AND TRADEMARK OFFICE
CERTIFICATE OF CORRECTION

PATENT NO. : 5,182,319

DATED : January 26, 1993

INVENTOR(S) : Mitchell

It is certified that error appears in the above-identified patent and that said Letters Patent is hereby corrected as shown below:

In the Abstract, line 4, after "1" please insert -- % --.

Col. 4, line 17, after "foot" please insert -- , --.

Col. 4, line 68, please delete "thermoplastio" and substitute therefor -- thermoplastic --.

Col. 5, line 29, after "sand)", please insert -- , --.

Signed and Sealed this

Sixteenth Day of November, 1993

Attest:

BRUCE LEHMAN

*Attesting Officer*    Commissioner of Patents and Trademarks